United States Patent Office

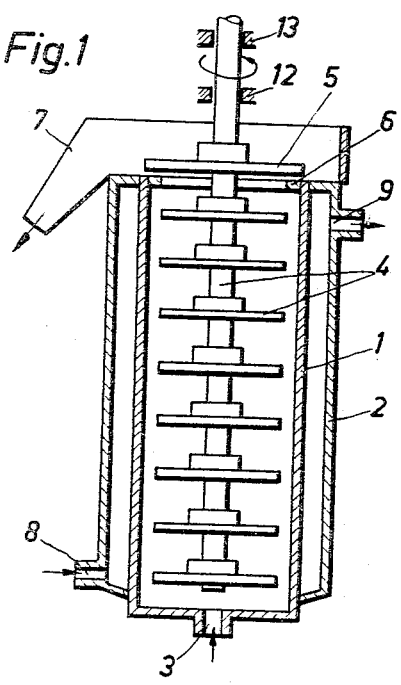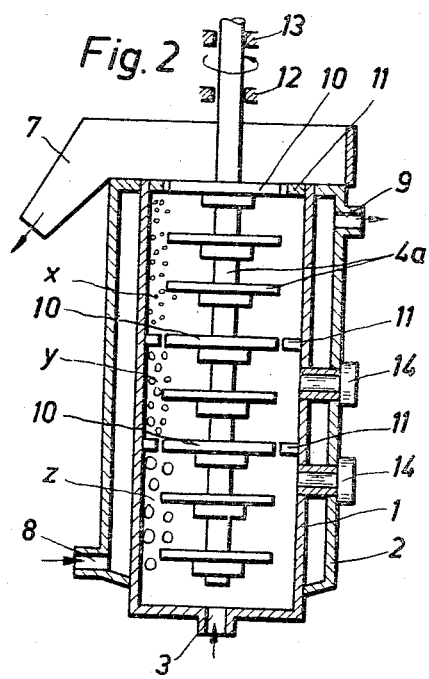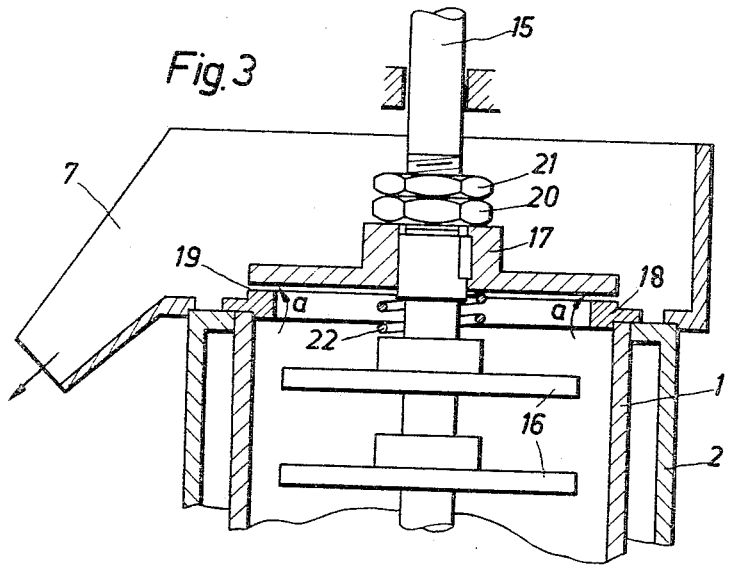

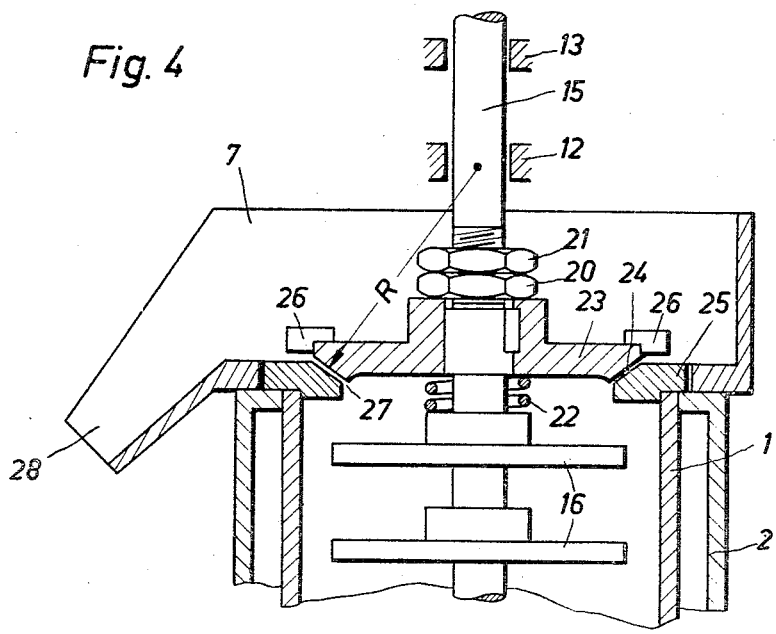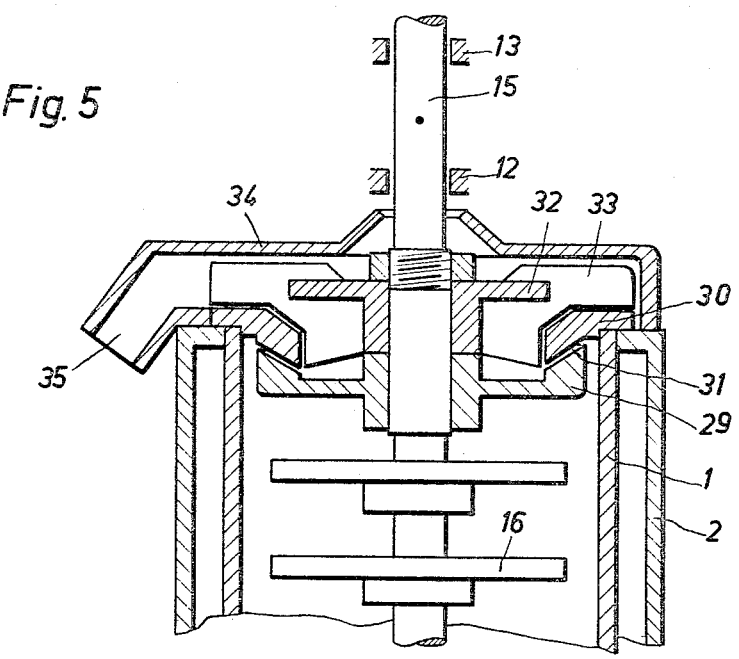

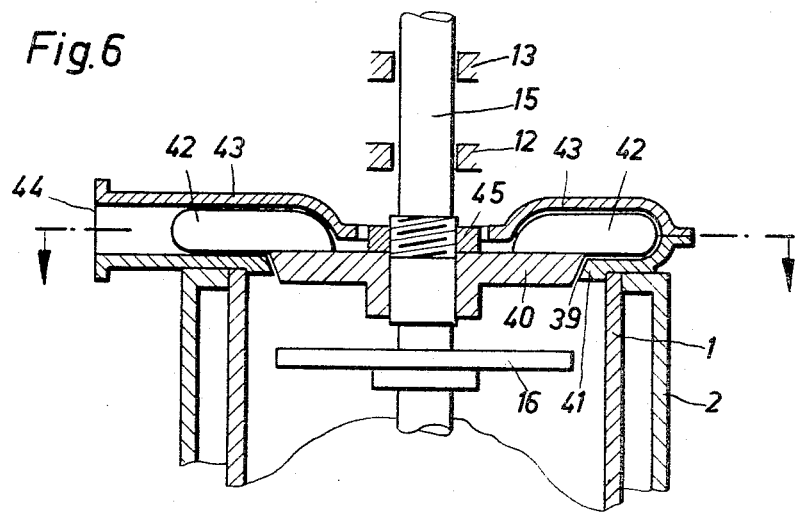
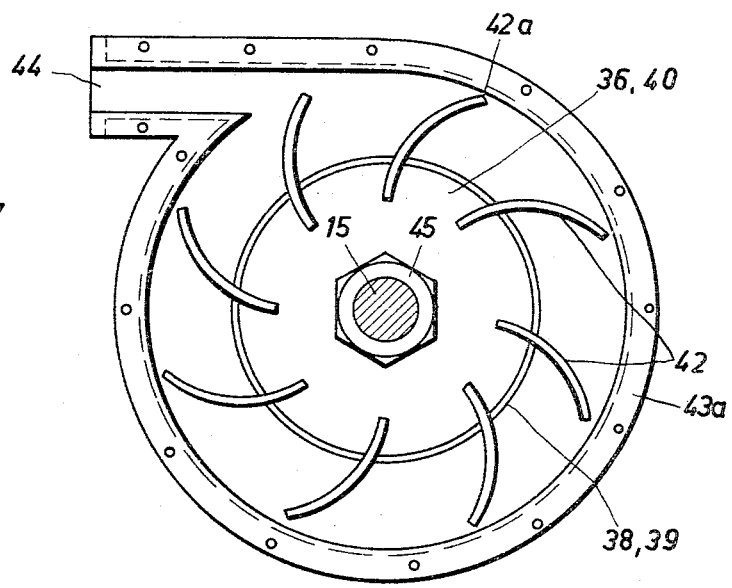

3,311,310
Patented Mar. 28, 1967

3,311,310
STIRRING MILL
Kaspar Engels, Mannheim-Waldhof, and Herbert Dürr, Beerfelden, Odenwald, Germany, assignors to Draiswerke G.m.b.H., Mannheim-Waldhof, Germany
Filed Oct. 16, 1964, Ser. No. 404,358
Claims priority, application Germany, June 20, 1964, D 44,734
15 Claims. (Cl. 241—153)

The invention relates to agitating or stirring apparatus and is particularly concerned with a stirring machine or mill.

The stirring mill in accordance with the invention comprises a grinding or stirring container or drum and a stirring mechanism rotatably supported therein. The stirring mechanism is constituted of a stirring shaft and elements such as stirring disks. The material to be ground passes through the stirring or grinding container in the presence of auxiliary grinding bodies such as sand, beads or the like, for grinding or dispersing solid bodies primarily in liquids. The inner space of the grinding container may be filled, for example, up to 50% of its volume, with auxiliary grinding bodies. The stirring mechanism is kept moving at relatively high speed while the material being ground or stirred is pumped in along one end wall of the container or drum, while it leaves the container at the other end wall, if need be, through a screen or straining device.

Stirring mills of this type are known. For example, mills have a vertically disposed grinding container which are filled with sand as auxiliary grinding bodies which is kept in motion by a combined grinding disk and mixing means and where the material being ground is pumped in from the bottom while it leaves at the upper end through a cylindrical screen.

There is also a different embodiment of grinding mills of this type where the auxiliary grinding bodies, for example, in the form of ceramic beads or small pebbles, are kept in motion by mechanisms having stirring arms or blades. In mills of this type it is practically inevitable that particularly where small auxiliary milling bodies are used, the auxiliary bodies are conducted through the flowing material being ground along to the outlet of the stirring or grinding mill. Theoretically the material being ground together with the auxiliary grinding bodies could be permitted to leave together to be subsequently separated, whereupon the auxiliary bodies would again be added to the material that is freshly pumped in. However, conventionally these stirring mills operate in a manner that at the outlet a screen is provided which retains the auxiliary milling bodies and permits only the material being ground to pass. Generally, stirring mills of this type operate in the screen area in such a manner that the alluvial forces are balanced out by the force of gravity. This balancing is practically a criterion for the maximum output performance of the mill. If the alluvial performance exceeds the force of gravity, whether it be due to very small auxiliary grinding bodies, to the level of the grinding material that is pumped through or to a corresponding increase in the viscosity, then these stirring mills flow over. If the operation is restricted to these conditions it is necessary that the material being ground is well flowable in order to be able to leave the screens at all. Increases in viscosity, evaporation and thixotrophy can affect the efficiency of the mills at the screen.

Attempts have been made to seal these screen spaces towards the stirring shaft by means of stuffing boxes, lip seals or the like. However, the finest of the solid bodies to be comminuted in these mills, where necessary with the aid of the friction of the auxiliary grinding bodies, caused the durability of the seals to be so short that uninterrupted operation over a longer period of time is impossible.

It is therefore an object of the invention to solve the problem of separating material being ground and auxiliary grinding bodies and to overcome the shortcomings referred to above in connection with known stirring mills. It is necessary to avoid that any harmful over-flow or sealing difficulties can occur. In this connection it is to be accomplished that the maximum production of the stirring mill can be increased almost at random. Furthermore, it is intended to avoid that the particular viscosity of the product to be worked does not impose limitations as far as the separating from the auxiliary grinding bodies is concerned.

Accordingly the invention provides in the first place that the separation between auxiliary grinding bodies and the material being ground is effected in a gap which is provided between a disk member which rotates with the stirring shaft and a counter ring surface provided on the grinding container. This arrangement makes it possible to forego the screen discharge that heretofore was utilized for stirring mills of this type.

The size of this gap between the rotating disk element and the associated counter ring plane can be adjustable by the axial displacement of the rotating disk element or of the associated counter ring. The necessary arrangement for the adjustment of the size of the gap can also be such that the adjustment takes place even during the operation of the mill. It is desirable that the magnitude of this gap between the rotating disk element and the associated counter ring surface be chosen in a manner that it is equal to or smaller than the radius of the smallest auxiliary grinding bodies contained in the material drum. The size of such auxiliary grinding bodies as have been generally used heretofore is in a range of 0.4 to 0.8 mm. or in a range of .2 to .3 mm. In order to achieve an effective separation between material being ground and auxiliary grinding bodies it is also necessary to give sufficient consideration to the magnitude of these auxiliary grinding bodies in a given case in connection with the arrangement or the adjustment of the gap between the rotating disk element and the associated counter ring. In accordance with the invention this can be accomplished in that the gap between the ring gap elements is adapted approximately to the cross section of the discharge passage of the material feed tube.

It is therefore a further object of the invention to subdivide the grinding container or drum into several zones by such ring gap elements arranged axially in sequence. This is particularly desirable when auxiliary grinding bodies of different sizes are to be used in different zones of the container for the material being milled. In this connection it may also be desirable that each individual zone of the container for the material is accessible through an aperture that may be closed by means of a plug.

It is a further object of the invention that the rotating disk element on the grinding mill shaft is journalled with a spring interposed to provide an aperture corresponding to the cross section of the gap.

This arrangement of the gap need not actually constitute a choking means even if a certain amount of choking were readily permissible. The shearing forces existing in the gap favor the discharge of the material to an extent that the gap exerts a certain suction effect. This applies to products of low as well as of high viscosity, and in extreme cases where particularly tough materials are concerned or with a gap arrangement where the entrance diameter is greater than the discharge diameter, it can be provided by the Weissenberg effect.

In accordance with a further essential development of the inventive concept the ring gap elements can also work against each other in the manner of a mill, for example, a cone mill. In that case shearing forces are effected to an increased extent on the material being worked which additionally support the grinding or dispersion effect by the stirring elements which are in the grinding container. In that event it may be desirable that the rotating disk element is journalled upon the grinding mill shaft while spring biased for displacement in the direction of the associated counter ring.

In order to increase the discharge velocity of the material being ground the invention provides furthermore that the rotating disk element is provided with winnowing shovels. Such winnowing shovels may be in the form of centrifugal pump blades and may be suitably encased.

The gaps between the rotating element and the stationary ring may be in the form of vertically extending annular cylinders, horizontally extending annular passages or gaps, ball mantle rings or ring slots which are a part of a ball casing. Annular gaps with the exception of ring cylinder gaps can be made to be adjustable as to width as aforementioned by the axial displacement of one of the two elements forming the gap. To the extent that any reactionary pressure of the material being ground is not effective in the sense of closing the gap, these disks may also be mounted for sliding movement on the shaft so that there is only an abutment for the extreme position for maximum gap dimension. This affords the possibility of the automatic adjustment of the gap width which permits of optimum discharge conditions.

The rotating element imparts in a conventional manner a considerable energy factor also to the radial acceleration of the material being discharged. This energy is still increased by providing the aforementioned rotating winnowing surfaces upon the rotating element. This combination "disk+winnowing surface" imparts sufficient energy for leaving the upper space of the mill laterally even to such products which are no longer flowable themselves. For products of medium or low viscous character it is even desirable to construct these winnowing surfaces in the manner of actual centrifugal pump blades. By suitably enclosing these blades the pumping effect provided by the blades can be transferred immediately for the forwarding of the material being ground also against noticeable pressure.

Further objects and advantages of the invention will become apparent from the accompanying drawings which illustrate embodiments of ring or annular gaps for separating the material being ground and the auxiliary grinding bodies in stirring mills, and in which FIGS. 1 to 6, inclusive, show schematically cross sections of a grinding mill or parts thereof, and FIG. 7 is a top view of the stirring mill in accordance with FIG. 6 with the cover portion removed.

In accordance with FIG. 1 the container 1 for the material being ground is provided with an outer mantle 2. The lower end of the milling container 1 has a material intake sleeve 3 through which the material is introduced under pressure for being stirred and ground. In the container 1 the stirring mechanism 4 which comprises a shaft and stirring disks is rotatably mounted. An element in the form of a disk 5 which rotates with the shaft is supported by said shaft in a manner to form a gap with and cooperate with an annular element 6 provided at the end of the container. The material being ground passes through the grinding container from the bottom to the top where it enters the discharge space 7 which is provided with a discharge opening. The intake socket 8 at the bottom of the container and the discharge socket 9 on the outer mantle 2 of the material container serve for the introduction and the discharge of a cooling or heating medium. The annular gap between the rotating disk member 5 and the counter ring 6 constitutes the gap which must be effective for separating the material being treated and the auxiliary grinding bodies.

In the embodiment in accordance with FIG. 2 the container 1 is again provided with an outer mantle 2 and the material feed sleeve 3. The outer mantle 2 is again provided with the sockets 8 and 9. Above the grinding or stirring container 1 a receiving vessel is arranged which has a discharge nozzle 7. The stirring mechanism 4a having a stirring shaft and stirring disks is mounted for rotation in the container. The stirring or grinding container in this case is subdivided into zones x, y and z. The zones are provided with auxiliary grinding bodies of different sizes. The separation of the material being ground from the auxiliary grinding bodies is effected by cylindrical gaps which are formed between the centrally rotating disks 10 and counter rings 11 secured to the inner wall of the stirring container. The stirring mechanisms 4 and 4a are journalled in bearings 12 and 13 to permit changing the quantity or other characteristics of the auxiliary grinding bodies in an operative machine in the zones x, y and z. Apertures are provided in the wall of the grinding container which can be closed by means of plugs 14.

FIG. 3 illustrates the upper portion of the stirring mill in accordance with the embodiment of FIG. 1. The stirring mill shaft 15 is mounted for rotation centrally of the container and is provided with stirring disks 16. The rotating disk element 17 is provided upon the stirring mill shaft 15 in a manner that its level or height can be adjusted. Slot 19 which extends horizontally and is of annular configuration is defined between the disk element 17 and the counter ring 18 which is secured to the wall of the container. The material being ground leaves the container through the gap in the direction of the arrows while the auxiliary grinding bodies are held back. The level of the disk 17 may be fixed in position by means of the nut 20 and counter nut 21, and springs 22 are provided in order to maintain the level of the disk 17.

In the embodiment in accordance with FIG. 4 a grinding container 1 is again provided which has an outer mantle 2, a grinding disk shaft 15, rotatable grinding disks 16 and a discharge nozzle 7. The shaft 15 has mounted thereon a disk 23 presenting a spherical surface section 24 having a radius which for the mounted condition of the shaft intersects the axis of the shaft proximate the lower bearing 12. The counter ring 25 which is secured to the container has a concave surface which corresponds to that of the ring 25. The disk 23 is again fixed at the desired level by means of a nut 20 and lock nut 21. The spring 22 biases the disk 23 upwardly and the disk 23 is provided with winnowing surfaces 26 which cast off the material leaving the gap 27 between the disk 23 and the ring 25.

A further embodiment of the inventive concept is reflected by FIG. 5. The shaft 15 is mounted for rotation centrally of the container and is supported in bearings 12 and 13. The disk 16 is mounted for rotation on the shaft 15 while the disk 29 which forms the gap at the end of the housing also rotates with the shaft. In this embodiment the rotating disk has a concave annular surface while ring 30 which is securely mounted on the container has a corresponding convex surface. The arrangement of the disk 29 below the ring 30 forces the material inwardly through the annular gap 31. For reasons of expediency and assembly facility an additional disk 32 having wings 33 is provided separately from the disk 29. The wings 33 are covered by a cap 34 provided with a discharge nozzle 35, and they are adapted to cast off the material being discharged by the gap 31 through the discharge opening or nozzle 35.

The embodiment in accordance with FIGS. 6 and 7 comprises the same general components as the embodiments described above and the shaft of the stirring mechanism is again shown at 15 and provided with a stirring disk 16. A conical gap 39 is provided which requires a somewhat conical surface on disk 40 and a corresponding counter ring 41 presenting a conical surface. Disk 40 is provided with fans 42 in the form of centrifugal pump blades. The disk 40 is covered by a casing portion 43 corresponding to a part of a pump housing and which has a tubular flange connection 44. The ground material which leaves gap 39 in flowable condition is pumped outwardly by the fans 42 through the flange connection 44. A nut 45 is provided upon the shaft 15 which retains the disk 40 at the desired level. Disk 40 is also provided with fans 42 which pump the material discharged by the gap 39 toward the tubular flange connection 44. The lower portion of the housing is indicated at 43a and the fans 42 rotate therein. It would, of course, also be possible to provide instead of the concentric housing 43a a housing having a free space which steadily increases outwardly toward the points of the blades 42a.

The annular gap arrangements in accordance with the embodiments of FIGS. 4, 5 and 6 are especially suitable for utilizing the stirring mill also in the manner of a cone mill. In that case it is also desirable that the rotating disk elements are arranged in a manner that they are movable toward one another by interposing a suitable spring to bias disk 40 in gap closing direction.

Having now described our invention with reference to the embodiments illustrated in the drawings, we do not wish to be limited thereto, but what we desire to protect by Letters Patent of the United States is set forth in the appended claims.

We claim:

1. In a stirring mill comprising a grinding container and a stirring mechanism mounted for rotation therein and including a vertically disposed stirring shaft having horizontally disposed stirring elements, auxiliary grinding bodies such as sand, beads or the like adapted to be contacted by material passing through said container for eliminating solids primarily in liquids, a disk element presenting a continuous imperforate surface mounted upon said shaft and rotatable therewith proximate an end of said container, said disk element having an outer portion defining an annular surface, and a counter ring presenting an annular surface disposed on said container adjacent said disk element and defining a gap with said annular surface of said disk element, the width of said gap being smaller than the outer dimensions of said grinding bodies for separating material being treated from said auxiliary grinding bodies.

2. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, a counter ring presenting an annular surface disposed on said container adjacent said disk element and defining a gap with said annular surface of said disk element for separating material being treated from said auxiliary grinding bodies, and axially adjustable means adapted to vary the position of said disk element and said counter ring relative to one another and thereby the width of said gap.

3. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, a counter ring presenting an annular surface disposed on said container adjacent said disk element and defining a gap with said annular surface of said disk element for separating material being treated from said auxiliary grinding bodies, and axially adjustable means adapted to vary the position of said disk element and said counter ring relative to one another and thereby the width of said gap, the width of said gap not exceeding one half of the largest dimension of the smallest of said auxiliary bodies.

4. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a plurality of disk elements mounted in spaced relation upon said shaft, said disk elements having outer portions defining annular surfaces, and a plurality of counter rings, one for each disk, mounted on said container each presenting an annular surface and cooperating with the annular surface of an adjacent disk element to define a gap for separating material being treated from said auxiliary grinding bodies, and succeeding cooperating disks and counter rings defining zones in said container with preceding disks and counter rings, and at least one aperture defined in said container to provide access to at least one said zone and a closure plug adapted to close said at least one aperture.

5. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, and a counter ring presenting an annular surface disposed on said container adjacent said disk element and defining a gap with said annular surface of said disk element for separating material being treated from said auxiliary grinding bodies, said container having an intake aperture in the form of a tube or sleeve and said gap defining a passage having a cross-sectional area corresponding in magnitude substantially to the cross sectional area of said aperture.

6. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, and a counter ring presenting an annular surface disposed on said container adjacent said disk element and defining a gap with said annular surface of said disk element for separating material being treated from said auxiliary grinding bodies, said disk element being supported by said shaft and said shaft being spring biased to bias said disk element toward said counter ring to define said gap between said disk and said ring.

7. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, and a counter ring presenting an annular surface disposed on said container adjacent said disk element and defining a gap with said annular surface of said disk element for separating material being treated from said auxiliary grinding bodies, said disk element being supported by said shaft and said shaft being spring biased to bias said disk element toward said counter ring to define said gap between said disk and said ring, said disk and counter ring cooperating in a manner to constitute said gap a milling passage.

8. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, a counter ring presenting an annular surface disposed on said container adjacent said disk element and defining a gap with said annular surface of said disk element for separating material being treated from said auxiliary grinding bodies, and a plurality of winnowing blades mounted on said disk element to increase the discharge velocity of said mill.

9. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, a counter ring presenting an annular surface disposed on said container adjacent said disk element and defining a gap with said annular surface of said disk element for separating material being treated from said auxiliary grinding bodies, and a plurality of winnowing blades mounted on said disk element to increase the discharge velocity of said mill, said winnowing blades having a configuration corresponding to the shape of the blades of a centrifugal pump.

10. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element mounted upon said shaft and rotatable therewith proximate an end of said container, said disk element having an outer portion defining an annular surface, and a counter ring presenting an annular surface disposed on said container adjacent said disk element and defining a gap with said annular surface of said disk element for separating material being treated from said auxiliary grinding bodies, said disk element and said counter ring having opposite annular surfaces inclined in the same direction and constituting between them a gap in the form of a conical annulus.

11. In a stirring mill comprising a grinding container and a stirring mechanism mounted for rotation therein and including a vertically disposed stirring shaft having horizontally disposed stirring elements, auxiliary grinding bodies such as sand, beads or the like adapted to be contacted by material passing through said container for eliminating solids primarily in liquids, a disk element presenting a continuous imperforate surface mounted upon said shaft and rotatable therewith proximate an end of said container, said disk element having an outer portion defining an annular surface, and a counter ring presenting an annular surface disposed on said container adjacent said disk element and defining a gap with said annular surface of said disk element for separating material being treated from said auxiliary grinding bodies, said gap defined between said disk element and said counter ring having the form of a horizontal annular disk, the width of said gap being smaller than the outer dimensions of said grinding bodies.

12. In a stirring mill comprising a grinding container and a stirring mechanism mounted for rotation therein and including a vertically disposed stirring shaft having horizontally disposed stirring elements, auxiliary grinding bodies such as sand, beads or the like adapted to be contacted by material passing through said container for eliminating solids primarily in liquids, a disk element presenting a continuous imperforate surface mounted upon said shaft and rotatable therewith proximate an end of said container, said disk element having an outer portion defining an annular surface, and a counter ring presenting an annular surface disposed on said container adjacent said disk element and defining a gap with said annular surface of said disk element for separating material being treated from said auxiliary grinding bodies, said gap defined between said disk element and said counter ring being in the form of a vertically extending cylinder ring, the width of said gap being smaller than the outer dimensions of said grinding bodies.

13. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element presenting a conical outer surface mounted upon said shaft and rotatable therewith proximate an end of said container and a counter ring presenting a conical inner surface disposed on said container adjacent said disk element and defining a gap with the conical outer surface of said disk element for separating material being treated from said auxiliary grinding bodies, said gap defined between said disk element and said counter ring being in the form of a conical annulus.

14. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element presenting a conical outer surface mounted upon said shaft and rotatable therewith proximate an end of said container and a counter ring presenting a conical inner surface disposed on said container adjacent said disk element and defining a gap with the conical outer surface of said disk element for separating material being treated from said auxiliary grinding bodies, said gap defined between said disk element and said counter ring being in the form of a conical annulus, said conical annulus having an end of relatively larger diameter and an end of relatively smaller diameter and said end of smaller diameter opening into said container.

15. In a stirring mill comprising a grinding container and a stirring mechanism mounted for rotation therein and including a stirring shaft having stirring elements, auxiliary grinding bodies such as sand, beads or the like adapted to be contacted by material passing through said container for eliminating solids primarily in liquids, a disk element presenting a conical upper surface mounted upon said shaft and rotatable therewith proximate an end of said container and a counter ring presenting a conical lower surface disposed on said container adjacent said disk element and defining a gap with the conical upper surface of said disk element for separating material being treated from said auxiliary grinding bodies, said gap defined between said disk element and said counter ring being in the form of a conical annulus, said conical annulus having an end of relatively smaller diameter and an end of relatively larger diameter and said end of larger diameter opening into said container.

References Cited by the Examiner

UNITED STATES PATENTS

| | | | |
|---|---|---|---|
| 2,581,414 | 1/1952 | Hochberg | 241—46 X |
| 2,855,156 | 10/1958 | Hochberg | 241—22 |
| 3,075,710 | 1/1963 | Feld | 241—22 X |
| 3,134,549 | 5/1964 | Quackenbush | 241—172 X |

FOREIGN PATENTS 642,127  2/1937  Germany.

WILLIAM W. DYER, Jr., *Primary Examiner.*

ROBERT C. RIORDON, *Examiner.*

H. F. PEPPER, Jr., *Assistant Examiner.*